(12) United States Patent
Geiger

(10) Patent No.: US 8,098,860 B2
(45) Date of Patent: Jan. 17, 2012

(54) HEARING APPARATUS WITH SPECIAL POWER SOURCE

(75) Inventor: Wolfgang Geiger, Lehrberg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1239 days.

(21) Appl. No.: 11/823,040

(22) Filed: Jun. 26, 2007

(65) Prior Publication Data

US 2008/0002847 A1  Jan. 3, 2008

(30) Foreign Application Priority Data

Jun. 26, 2006  (DE) .......................... 10 2006 029 197

(51) Int. Cl.
*H04R 25/00* (2006.01)
(52) U.S. Cl. .................... 381/323; 381/328; 381/330
(58) Field of Classification Search .......... 381/322–324, 381/330, 328
See application file for complete search history.

(56) References Cited

U.S. PATENT DOCUMENTS

| | | | |
|---|---|---|---|
| 6,058,198 A * | 5/2000 | Aceti et al. ..................... | 381/323 |
| 6,208,741 B1 | 3/2001 | Shennib et al. | |
| 6,473,513 B1 * | 10/2002 | Shennib et al. ............... | 381/328 |
| 2006/0159298 A1 * | 7/2006 | von Dombrowski et al. . | 381/330 |

FOREIGN PATENT DOCUMENTS

| | | |
|---|---|---|
| DE | 298 01 567 U1 | 5/1998 |
| WO | 9704619 A1 | 2/1997 |
| WO | 9955131 A1 | 11/1999 |

* cited by examiner

*Primary Examiner* — Elvin G Enad
*Assistant Examiner* — Andrew R Millikin

(57) ABSTRACT

Hearing apparatus and especially hearing devices are to be designed to be smaller. To this end there is provision for the shell or otoplastic to be worn in the auditory canal or for the housing of the hearing apparatus to be made of battery layers, so that the shell or otoplastic or the housing of the hearing apparatus itself represents the battery. Alternatively the hearing device battery can also be relocated from a conventional hearing device into a normal otoplastic, with this also reducing the volume of the hearing device. The reduction in volume allows the acceptance of wearing the hearing device to be greatly increased, and a variant of the hearing apparatus can be more easily implemented as a cymba device.

12 Claims, 1 Drawing Sheet

FIG 1
(prior art)
FIG 2
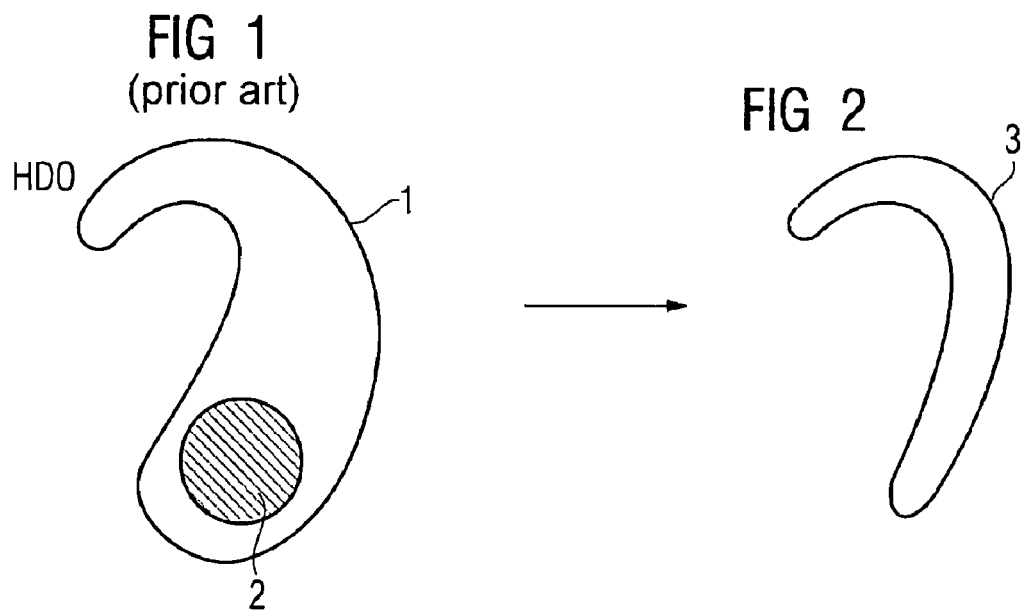
FIG 3
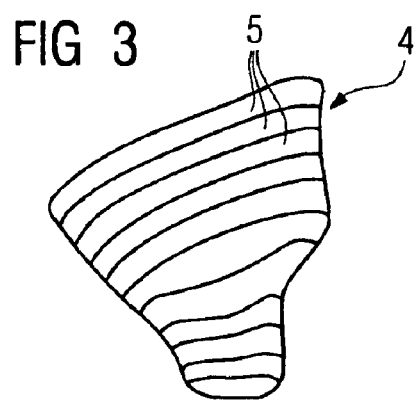
FIG 4
(prior art)
FIG 5
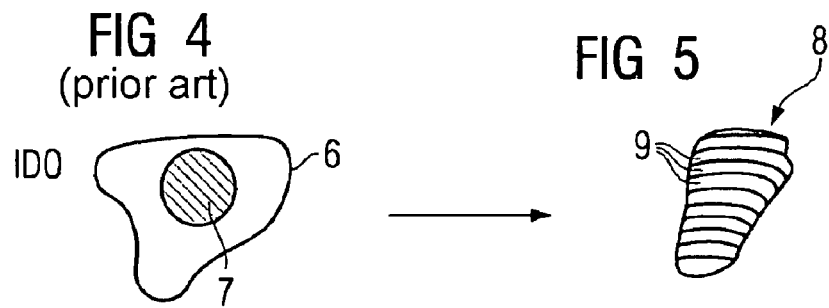

HEARING APPARATUS WITH SPECIAL POWER SOURCE

CROSS REFERENCE TO RELATED APPLICATIONS

This application claims priority of German application No. 10 2006 029 197.2 filed Jun. 26, 2006, which is incorporated by reference herein in its entirety.

FIELD OF THE INVENTION

The present invention relates to a hearing apparatus with a shell which can be at least partly worn in the auditory channel. In addition the present invention relates to a behind-the-ear hearing device with a housing for wearing behind the ear, an otoplastic for wearing in/on the auditory canal of the ear, a connecting line via which the otoplastic is connected to the housing, and a power source.

BACKGROUND OF THE INVENTION

Hearing apparatus and especially hearing devices are as a rule supplied with power via a battery. The battery is generally accommodated in a battery compartment in the housing of the hearing apparatus, specifically in the hearing device housing.

To design hearing devices to be as small as possible, small button cells are currently used as the power source. But even these button cells occupy a relatively large amount of space in the hearing device housing. Not infrequently they demand around 15% to 30% of the entire interior space of the housing. The result of this is that the hearing device housings have to be designed to be correspondingly voluminous.

A further problem of small batteries relates to replacing the batteries. For older hearing aid wearers this battery replacement is often extraordinarily difficult because their reduced tactility.

Patent application 200600862 U.S. Pat. No. 6,058,198 describes a battery and a circuit arrangement for a hearing device. The electronic circuit has a sealed housing with an air cathode/separator arrangement including a catalyzer layer. The housing is filled with an electrolyte/anode mixture to create a battery for the electronic circuit.

A bearing aid with a housing which can be worn behind the ear is known from publication DE 298 01 567 U1. In addition it features an ear adapter which is worn in the auditory canal of the ear. This ear adapter features an earpiece, which is supplied with power via an electrical line from an amplifier in the hearing device housing. A battery is also provided in the bearing device housing.

Furthermore the publication U.S. Pat. No. 6,208,741 B1 discloses a battery holder for auditory canal hearing devices. The battery holder is itself introduced into the auditory canal and is electrically and mechanically connected to the hearing device.

SUMMARY OF THE INVENTION

The object of the present invention consists of designing hearing apparatus and especially hearing devices to be smaller.

According to the invention this object is achieved by a hearing apparatus with a shell which can be worn at least partly in the auditory canal, where the shell is made from battery layers and forms a power source for the hearing apparatus.

In addition there is inventive provision for a behind-the-year hearing device with a housing for wearing behind the ear, an otoplastic for wearing in/on the auditory canal of the ear, a connecting line via which the otoplastic is connected to the housing and a power source, with the power source being arranged in the otoplastic and delivering energy via the connecting line to the housing or the housing itself representing the power source.

In accordance with the present invention this produces a reduction in size of the hearing apparatus by virtue of the fact that the shell of the hearing apparatus itself forms the battery, or by the battery being relocated into an otoplastic outside the hearing device housing.

In accordance with an inventive variant the hearing apparatus is embodied as an in-the-ear (ITE) hearing device with the shell representing the hearing device housing. This allows the reduction in volume which is so important for ITEs to be significantly progressed.

In accordance with another variant the device is embodied as a behind-the-ear (BTE) hearing device, with the shell representing an otoplastic which can be worn in/on the auditory canal which is connected electrically to an electronics unit of the BTE which can be worn behind the ear. In this way the space frequently available in the otoplastic can be used for supplying power.

The otoplastic can serve electrically exclusively as the power source and not contain any of the electronic components which are used for another electronic functionality. This means that the otoplastic which is frequently only used mechanically obtains a further, namely electrical functionality: the generation of power.

Alternatively the otoplastic can be restricted from the electrical viewpoint to two functionalities, namely the functionality of a power source and that of an electro-acoustic sound converter. Variants of the device in which the sound is generated directly in the otoplastic can also profit from the invention.

The connection between the BTE and the otoplastic connected to it can be made through a sound tube with electrical lines, with the lines being used to supply power to the BTE. If necessary data and/or control signals are transmitted simultaneously over the lines. The sound tube can be made of conductive materials such as metals, alloys, plastics or partly contain them for this purpose.

The power source which is embodied in the form of a housing or which is relocated from the hearing device housing into an external otoplastic can be a rechargeable source. In particular this then allows benefits to be obtained if the shell or the entire hearing apparatus has been individually adapted in a complex process and the hearing apparatus does not have to be thrown away at the end of the life of the battery.

BRIEF DESCRIPTION OF THE DRAWINGS

The invention will now be explained in more detail on the basis of the enclosed drawings, which show:

FIG. 1 a BTE in accordance with the prior art;
FIG. 2 an inventive hearing apparatus device which is to be worn in the cymba, with battery housing or relocated battery;
FIG. 3 an otoplastic with inventive layer structure;
FIG. 4 an ITE in accordance with the prior art and
FIG. 5 an inventive ITE with battery layer housing.

DETAILED DESCRIPTION OF THE INVENTION

The exemplary embodiments described in greater detail below represent preferred embodiments of the present invention.

FIG. 1 first shows a conventional-design BTE in a schematic diagram. The housing 1 consists of injected plastic or a lithographically produced plastic body. In the housing is an unseen hearing aid battery 2 which is indicated symbolically in FIG. 1 to illustrate its size. The battery 2 occupies appr. 15% to 30% of the interior space of the hearing device housing 1.

The invention now makes provision for relocating the battery out of the BTE. This allows a BTE to be made using the design shown in FIG. 2. This BTE possesses a significantly slimmer housing 3 since it does not have to accommodate a battery. This means that wearing it in concha, but also behind the ear is possible.

The battery is integrated into a otoplastic similar to that shown in FIG. 3. In principle a conventional button cell can be accommodated in the otoplastic. The power is then supplied to the BTE via power supply lines which lead from the otoplastic to the BTE. The power supply lines can be integrated into a sound tube which connects the BTE to the otoplastic in any event.

In accordance with a further embodiment shown in FIG. 3 the otoplastic 4 or shell of a BTE is constructed from numerous battery foil layers 5. These types of battery foils are for example described in publication WO 01/41246 A1 described.

During manufacturing a mold of a patient's ear is made. This ear mold is optically scanned with a special scanner, so that corresponding digital data can be obtained as regards the spatial design of the mold. This information is also able to be obtained by "in-ear-scan" technology without the mold of the auditory canal having to be made. Layer contour data is obtained from this digital data in a similar way to the way it is obtained for lithography. On the basis of this layer contour data corresponding shapes are punched or made from a battery foil corresponding to each layer. The individual battery foil layers are then pressed together and connected to form a complete battery. This gives the otoplastic the electrical functionality of a battery. The power supply lines to the BTE are implemented as in the above example.

The fact that the battery is relocated from the BTE enables the size of the BTE to be significantly reduced. It can then be redesigned into a cymba-concha device. It can then however also be embodied as another concha device. Overall the size of the hearing device is able to be reduced so that it is less obtrusive when being worn. In the final analysis this reduces the threshold of resistance to wearing a hearing device.

FIG. 4 shows a schematic of an ITE in accordance with the prior art. The conventional ITE housing 6, which is manufactured for example with a rapid prototyping method, also accommodates a battery 7. This is again schematically indicated in FIG. 4.

In accordance with a further inventive variant the ITE-housing 8 is itself embodied as a battery. To this end the ITE-housing 8 in accordance with FIG. 5 is manufactured from battery foil layers 9 like the otoplastic 4 described above. This allows a battery to be dispensed with for the ITE device too, which makes the overall space occupied by the ITE smaller. The ITE shell or the ITE housing 8 is manufactured like the otoplastic of FIG. 3.

Because the volume of the ITE is reduced, it can be embodied slimmer, so that it can be inserted deeper into the auditory canal. This again produces cosmetic advantages and thereby greater acceptance.

A battery otoplastic can be implemented as pure consumable material with a short life span. The battery life span typically amounts to between two weeks and two months. Alternatively a rechargeable otoplastic, constructed from rechargeable foil layers, can be manufactured. The ability to be recharged typically extends its use to two years for example. In a similar way an ITE shell can also be manufactured as rechargeable and non-rechargeable.

The invention claimed is:

1. A hearing apparatus, comprising:
   a shell that can be at least partly worn in an auditory canal of a user of the hearing apparatus,
   wherein the shell is configured to be made from a plurality of battery layers and serves as a power source for supplying power to the hearing apparatus,
   wherein the hearing apparatus is a behind-the-ear hearing device,
   wherein the shell is an otoplastic that is wearable in the auditory canal and electrically connected with a behind-the-ear electronic unit of the behind-the ear hearing device.

2. The hearing apparatus as claimed in claim 1, wherein the otoplastic serves exclusively only as the power source and does not contain any other electrical components that are used for any other electronic functionality.

3. The hearing apparatus as claimed in claim 1, wherein the otoplastic serves exclusively as the power source and an electro-acoustic sound converter.

4. The hearing apparatus as claimed in claim 1, wherein the power source is rechargeable.

5. A behind-the ear hearing device, comprising:
   a housing that is worn behind an ear of a user of the behind-the ear hearing device;
   an otoplastic that is worn in an auditory canal of the ear;
   a connecting line that connects the otoplastic to the housing; and
   a power source that is arranged in the otoplastic and supplies power to the behind-the ear hearing device via the connecting line.

6. The behind-the ear-hearing device as claimed in claim 5, wherein the connecting line is a sound tube comprising an electrical line.

7. The behind-the ear-hearing device as claimed in claim 5, wherein the otoplastic serves exclusively only as the power source and does not contain any other electrical components that are used for any other electronic functionality.

8. The behind-the ear-hearing device as claimed in claim 5, wherein the otoplastic serves exclusively as the power source and an electro-acoustic sound converter.

9. The behind-the ear-hearing device as claimed in claim 5, wherein the power source is rechargeable.

10. A method for supplying power to a hearing apparatus, comprising:
    making a shell that can be at least partly worn in an auditory canal of a user of the hearing apparatus; and
    supplying power to the hearing apparatus by the shell,
    wherein the hearing apparatus is a behind-the-ear hearing device, and
    wherein the shell is an otoplastic that is wearable in the auditory canal and electrically connected with a behind-the-ear electronic unit of the behind-the ear hearing device.

11. The method as claimed in claim 10, wherein the otoplastic is made from a plurality of battery layers.

12. The method as claimed in claim 10, wherein a power source is arranged in the otoplastic.

\* \* \* \* \*